United States Patent Office 3,201,878
Patented Aug. 24, 1965

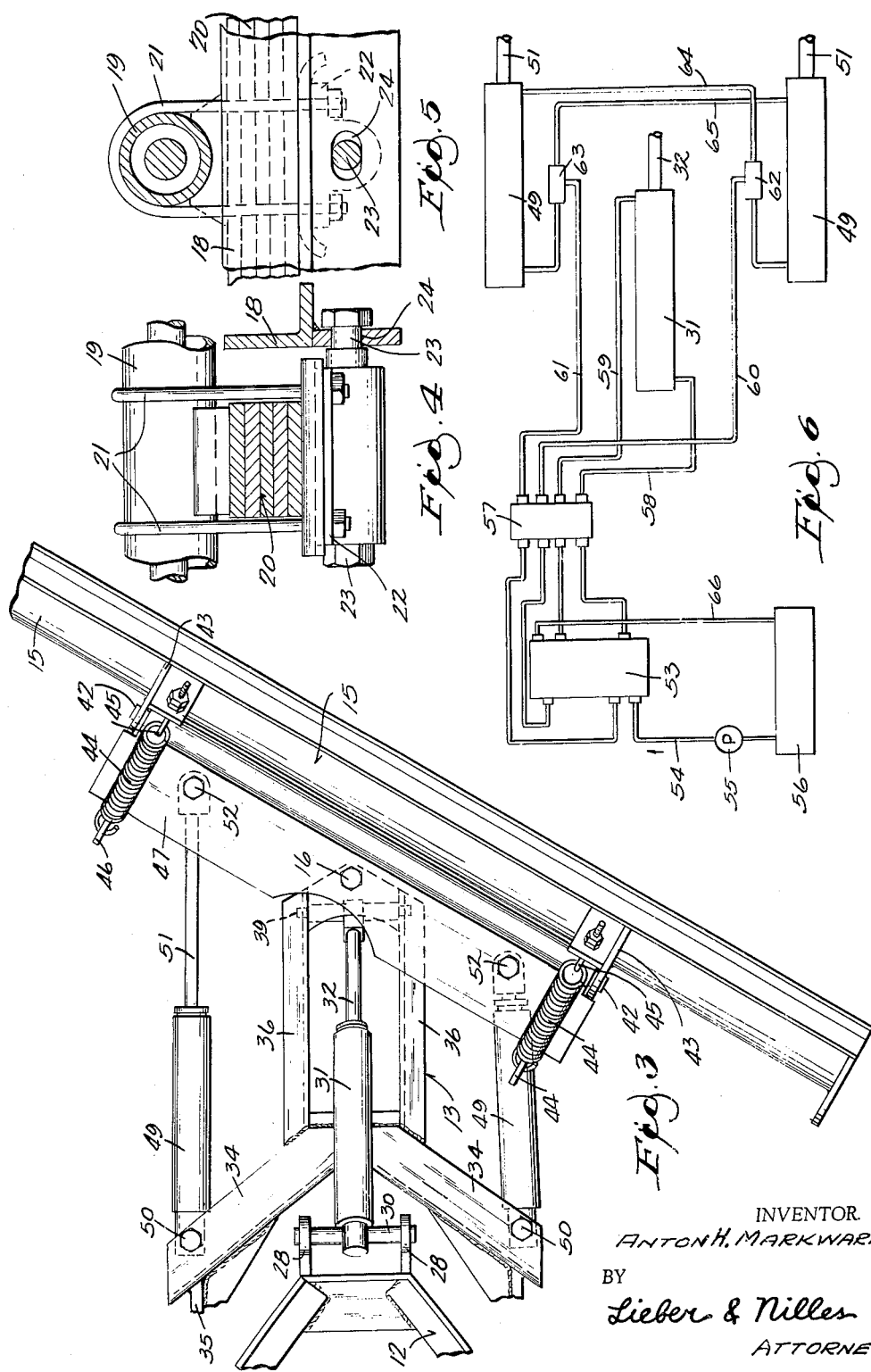

3,201,878
PLOW ATTACHMENT FOR VEHICLES
Anton H. Markwardt, Milwaukee, Wis., assignor to Peerless Gear & Engineering, Inc., Milwaukee, Wis., a corporation of Wisconsin
Filed May 10, 1963, Ser. No. 279,484
7 Claims. (Cl. 37—42)

The present invention relates generally to improvements in vehicle attachments, and relates more particularly to the provision of an improved hydraulically operable scraper or plow.

A primary object of the invention is to provide an improved self-contained and universally adaptable snowplow or the like which is extremely durable and compact in construction, highly efficient in operation and which may be manufactured and sold at relatively low cost.

Various and sundry types of snowplows have heretofore been proposed for street, driveway and sidewalk cleaning operations. Many of these prior devices are hydraulically operated under control of an operator seated within the vehicle, and in some cases, provision is made for changing the angularity of the blade by means of a plurality of hydraulic cylinders cooperating therewith.

These devices must meet various requirements without adversely affecting the operation or handling of the vehicles to which they are attached. They must be extremely rugged and capable of absorbing considerable shock, wear and general abuse. They must furthermore be capable of production and sale at a price within the means of service station operators and the like, and must be readily adaptable for rapid attachment to a variety of vehicles in a relatively simple manner. In addition, they must be of unitary construction for display, shipping and similar purposes, and above all, they must be flexible in their adaptations for performing a wide variety of operations under varying conditions.

The present invention contemplates the provision of a plow attachment for vehicles which most effectively meets all of the foregoing requirements.

In accordance with this invention, a unitary plow assemblage is provided which is readily attachable to the framework of almost any conventional truck, automobile or like vehicle and which is adjustable at the will of the operator over a wide range of adjustment for the performance of various types of plowing operations.

These and other objects and advantages of the invention and of the mode of utilizing the improved device will become apparent from the following detailed description considered in conjunction with the accompanying drawings in which:

FIG. 3 is a similar fragmentary top view of the plow attachment showing the blade actuated to an angular position about its vertical pivot;

FIG. 4 is a somewhat enlarged fragmentary section adjacent one of the frame mountings taken along the line 4—4 of FIG. 2;

FIG. 5 is a similarly enlarged view taken from the side of the mounting of FIG. 4 and showing the vehicle axle in section;

FIG. 6 is a schematic diagram of the hydraulic system for controlling actuation of the rams; and FIG. 7 is another enlarged section through the front pivotal mounting for the blade taken along the line 7—7 of FIG. 2.

Figure 1:
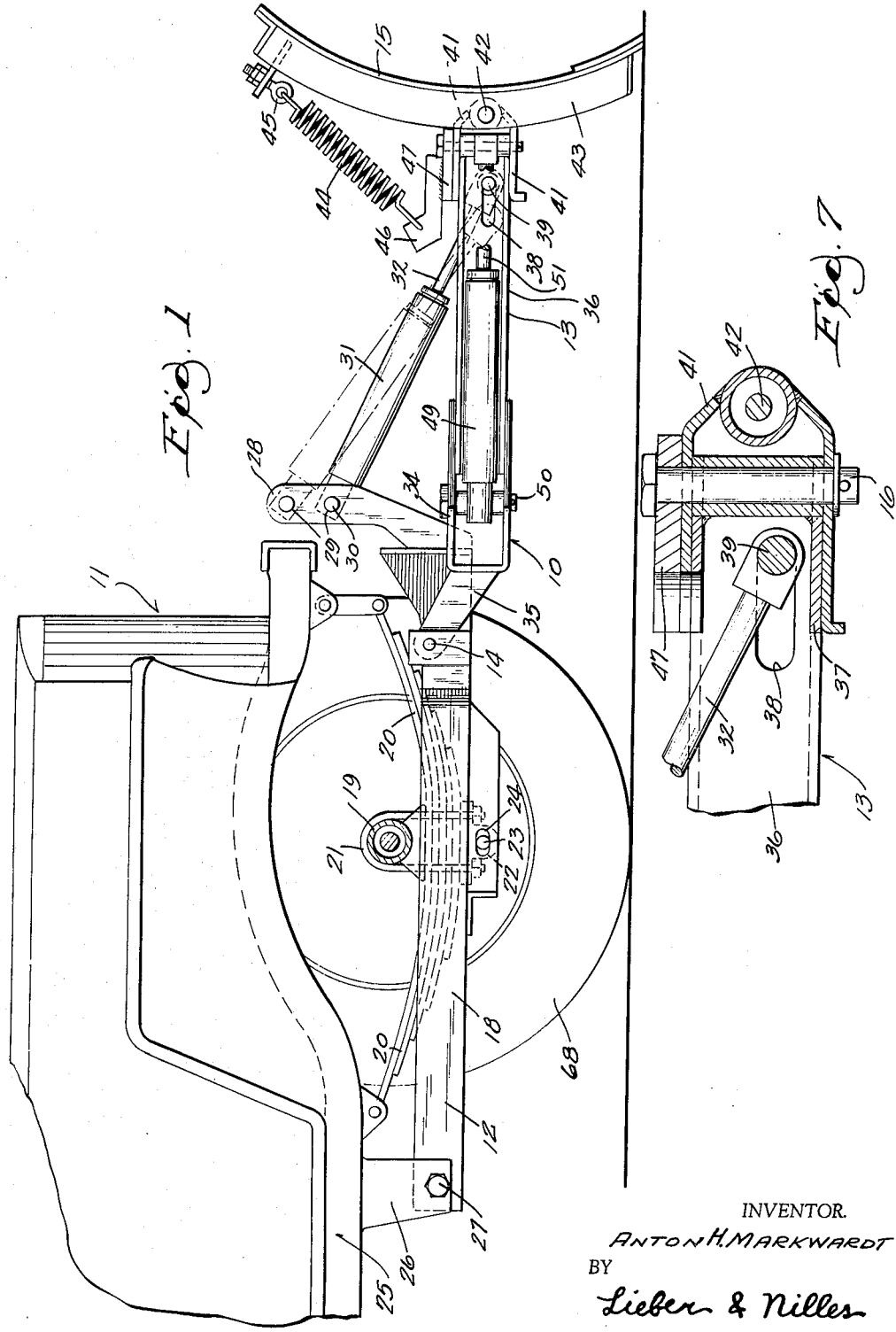
FIG. 1 is a fragmentary side elevational view of an automotive vehicle with a typical snowplow embodying the features of the invention mounted thereon.
Figure 2:
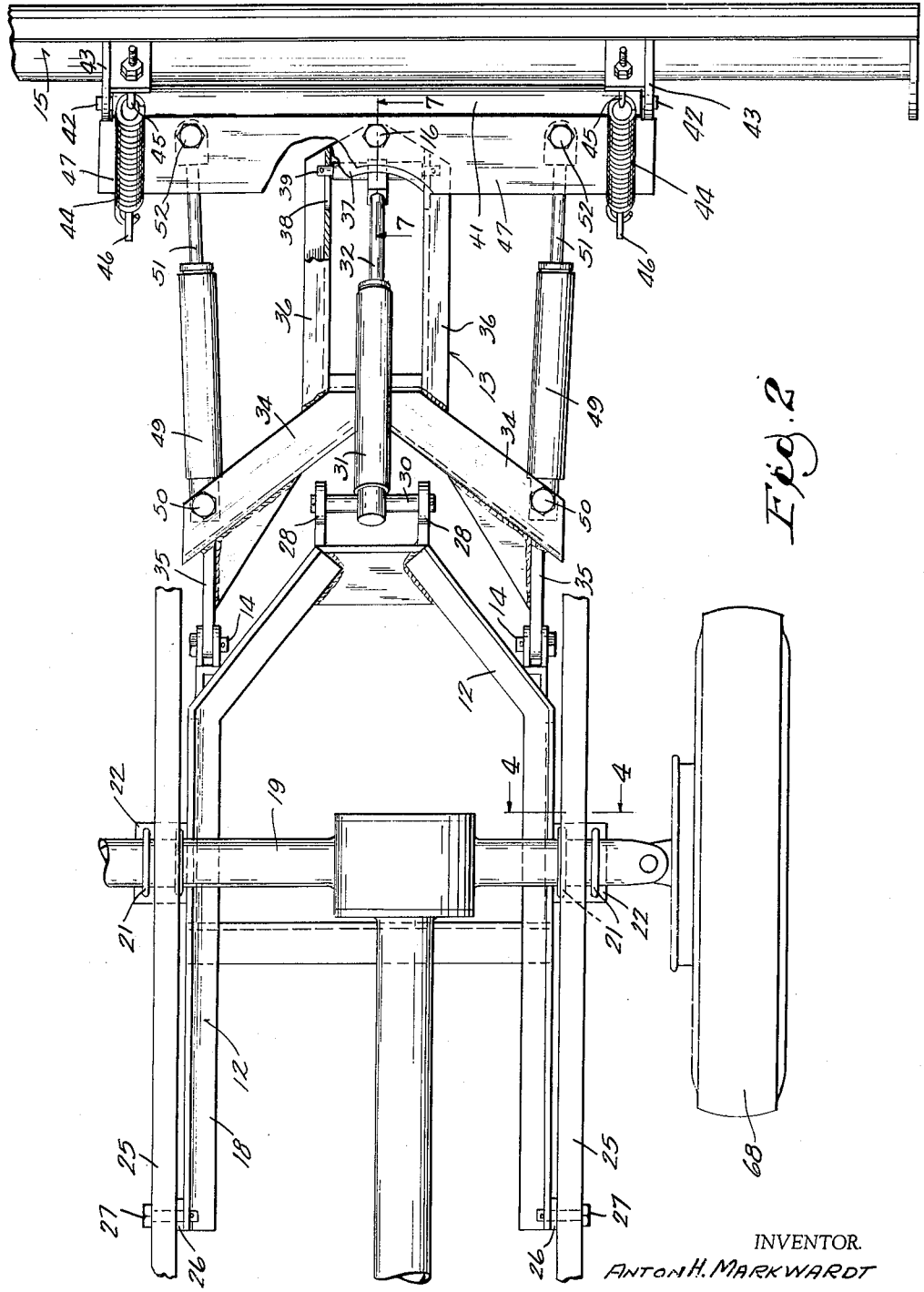
FIG. 2 is a fragmentary top view of the plow and that portion of the vehicle chassis to which it is attached, portions being broken away for the sake of clarity.

While the improved device has been specifically illustrated and described herein as being especially adapted for use as a snowplow attachment for a particular type of automotive vehicle, it is not desired or intended to unnecessarily restrict the scope or utility of the improvements by reason of such limited embodiment; and it is furthermore contemplated that certain descriptive terms used herein shall be given the broadest possible interpretation consistent with the disclosure.

Referring to the drawings, the snowplow attachment 10 embodying the invention is shown mounted on the front end of an automotive vehicle designated by the reference numeral 11. Generally speaking, the plow attachment comprises, a generally U-shaped rigid mounting frame 12, a tiltable blade carrying frame 13 pivotally secured to the mounting frame 12 as at 14 for swinging movement in a vertical plane, and a plow blade 15 secured to the forward end of the carrying frame 13 remote from the frame 12 by a vertical pivot 16 permitting swinging movement of the blade in a horizontal plane.

The U-shaped frame 12 may be formed of angle iron or the like and is rigidly mounted on the vehicle frame by means of the side arms 18, each of which is secured at a medial portion to the front axle 19 below the springs 20 by means of U-shaped saddle bolts 21 and a clamping crosspiece 22 carrying a laterally extending bolt or shaft 23 extending through an elongated slot 24 formed in a flange on the adjacent side arm 18. In addition, each of the side arms 18 of the U-shaped frame 12 is secured at its free end to a depending ear or lug 26 of the adjacent longitudinal side frame member 25 of the vehicle by means of a suitable pin or bolt 27, and while the saddle bolts 21 and clamping member 22 cooperated with the lugs 26 and pins 27 to provide an effective rigid mounting for the fixed frame 12, the slot 24 receiving the pin 23 permits slight movement and prevents binding which might otherwise result from action of the spring 20.

Also, the front end of the mounting frame 12 is provided with a pair of integral upstanding arms 28 having one or more aligned holes 29 for selectively receiving a horizontal pivot pin 30 supporting a hydraulic ram cylinder 31 which is connected through its plunger or piston 32 to the forward end of the frame 13 for lifting and lowering the blade 15 as will hereinafter more fully appear. Thus, the entire plow assemblage is self-contained and completely eliminates need for attaching the lift cylinder to the vehicle bumper or to any attendant parts of the vehicle wherein lifting, lowering and plowing forces are transmitted directly to the vehicle to create undesirable stresses and strains and possible distortion of the frame, bumper, springs or the like. As shown, the entire mounting frame 12 is of unitary construction and is formed of angle iron and metal straps and plate stock suitably welded and secured to the vehicle in a manner wherein the entire weight of the plow assemblage is carried by the front axle 19 through the U-bolts 21 while the rearward thrust during plowing is absorbed through the lugs 26 by the vehicle frame.

The lift frame 13 may likewise be formed entirely of angle iron and plate stock and comprises a generally V-shaped brace and support member 34 having a pair of rearwardly and upwardly directed ears 35 secured thereto by welding or the like, the ears 35 being secured to the frame 12 by the aligned pivots 14 to permit the frame 13 to be swung in a vertical plane. Also welded to the brace member 34 and projecting forwardly from the medial portion thereof are a pair of rigid arms 36 joined by a yoke 37 at their extreme forward ends and provided with aligned slots 38 immediately to the rear of the yoke, the slots 38 slideably receiving the ends of a pin 39 secured to and carried by the extending end of the ram plunger 32 to transmit lifting and lowering forces to the frame 13, such forces being absorbed entirely by the plow assemblage 10 independently of the vehicle 11 by reason of the fact that both the pivotal attachments 14 and 30 are on the integral mounting frame 12.

The plowshare or blade 15 is attached to the yoke 37 by means of an apertured swivel member 41 secured by the pivot pin 16, the member 41 in turn carrying an elongated pivot shaft 42 extending perpendicular to the pivot pin 16 and received at its ends by flanges 43 projecting rearwardly from the blade 15. Thus, the blade 15 may be rotated in a horizontal plane to different angular positions about the pivot 16 and may also tilt in a vertical plane about the pivot 42. However, tilting of the blade 15 about the pivot 42 is constantly resisted by a pair of tension springs 44 or the like each secured between a hook or eye 45 attached to the upper portion of the blade 15 and a lug 46 or the like attached to an elongated plate or bar 47 welded or otherwise secured to the top of the swivel member 41. To provide a stop for the blade 15 limiting pivotal movement thereof in a counter-clockwise direction as viewed in FIG. 1, the plate 47 is of such length as to extend beyond the flanges 43 and the springs 44 accordingly cause the flanges 43 to bear against the plate 47 while permitting tilting of the blade only in opposition to the springs.

To swing the blade in a horizontal plane about the pivot 16, a pair of hydraulic rams are provided, the cylinder end 49 of each such hydraulic unit being pivotally attached as at 50 to an end of the brace 34 with the piston 51 being likewise pivotally attached as at 52 to the plate 47 of the swivel member 41. The rams 49, 51 are preferably located so as to be in approximate alinement with the ears or wings 35 but have their piston ends 51 spaced slightly further apart than their cylinder ends 49 to compensate for lateral displacement when actuated to swing the blade 15 to angular positions such as shown in FIG. 3.

The hydraulic ram units may be conveniently controlled from a single station located near the opeator within the vehicle 11, and a suitable four-way hydraulic control valve unit 53 may be provided for this purpose. As diagrammatically shown in FIG. 6, the hydraulic control unit 53 communicates by way of conduit 54 with a pump 55 supplying pressure fluid thereto from a supply tank 56. Under control of the valve 53, the pressure fluid may be selectively conducted by way of a hydraulic manifold 57 through conduits 58, 59 to actuate the lift rams 31, 32 or through conduits 60, 61 to actuate the rams 49, 51 which are hydraulically coupled through manifolds 62, 63 and conduits 64, 65 for simultaneous operation. Fluid is of course by-pased from the control valve 53 back to the tank 56 via the conduit 66 when the pressure fluid is not required by the hydraulic rams.

From the foregoing detailed description, it is believed apparent that the invention contemplates provision of a self-contained plow attachment for automotive vehicles which may be readily mounted so that the entire weight of attachment is placed on the front axle with all torque and stresses being absorbed by the attachment per se and not by the structural parts of the vehicle. The plow blade 15 together with its swingable carrying frame 13 may be selectively lifted or lowered by means of the hydraulic ram units 31, 32, and for normal plowing without down pressure, the plunger 32 of the ram is extended only far enough so that the pin 39 is located at the rear of the slots 38 thereby permitting the blade to bounce or swing vertically to a limited extent as when the blade encounters obstructions. If it is desired to plow with down pressure as when scraping, the plunger 32 of the ram is extended so that the pin 39 is engaged at the forward end of the slots 38 whereupon the blade is obviously constantly maintained in engagement with the surface being worked. Also, if it is desired to obtain a greater down pressure or a higher lift of the blade 15, the cylinder end 31 of the ram may be pivotally attached in the upper openings 29 of the arms 28 as illustrated by means of dot-and-dash lines in FIG. 1, the leverage thereby being increased by virtue of the angle at which the ram is disposed. An important feature of the invention accordingly resides in the pin and slot connection 39, 38 between the forward end of the swingable frame 13 and the piston 32 of the lift ram and in the provision of alternate connections provided between the cylinder 31 and the arms 28. A further important feature of the invention is the formation of the arms 28 as an integral part of the mounting frame 12 so that all pressures and forces are absorbed through the frame 12 rather than a structural part of the vehicle, the weight or thrust being directly transferred from the frame 12 to the axle and tires 68 of the vehicle. The particular manner in which the U-shaped main mounting frame 12 is attached to the vehicle axle beneath the springs and rearwardly thereof to the lugs 26 on the side rails of the frame permits use of an extremely compact assemblange and eliminates objectionable weight which would normally be placed on the springs, and such structure furthermore insures provision of a plow attachment wherein true down pressure may be exerted on the blade for effective scraping both in forwardly and rearwardly directions without placing resultant torque on the vehicle per se, such torque being absorbed entirely by the U-shaped frame 12.

The improved plow attachments have, in fact, gone into actual commercial use and have met with considerable favorable acceptance. In addition to the simplicity in construction of the improved devices, they may be readily attached to almost any conventional automotive vehicle with the aid of only a few normally available tools and without need for reconstructing, eliminating, or converting. By reason of the fact that the entire assemblage is self-contained and requires attachment solely to the axle and the frame entirely below the vehicle rather than to such structural parts as the bumper, the improved assembage may be used to special advantage on vehicles of so-called cab over engine design wherein the entire cab must be tilted forwardly for access to the engine, in which case the present attachment does not interfere.

Various modes of carrying out the invention are contemplated as being within the scope of the following claims particularly pointing out and distinctly claiming the subject matter which is regarded as the invention.

I claim:

1. A vehicle attachment comprising, a mounting frame fixedly attachable to a vehicle and having a rigid upstanding arm formed integral with the forward end thereof, a carrier frame pivotally attached to the forward end of said mounting frame for swinging movement in a substantially vertical plane, a plow blade pivotally attached at a medial portion thereof to the free end of said carrier frame for swinging movement in a horizontal plane about a vertical pivot, actuating means hingedly connected between said carrier frame and said plow blade for swinging said plow blade about its pivot, and hydraulic actuating means connected between the upstanding arm of said mounting frame and the free end of said carrier frame for swinging said carrier frame about its pivot axis to thereby raise and lower said plow blade, said hydraulic actuating means being connected to said carrier frame by a pin operating within a slot extending longitudinally of said carrier frame, whereby said actuating means may be adjusted from a position wherein the free end of the carrier frame is permitted limited free swinging movement to a position wherein it is placed under constant down pressure.

2. A vehicle attachment according to claim 1, wherein the upstanding arm of the mounting frame is located forwardly beyond the pivotal attachments of the carrier frame thereto.

3. A vehicle attachment according to claim 1, wherein the connection for the hydraulic actuating means to the upstanding arm is located above and forwardly of the pivotal attachments of the carrier frame to the mounting frame with means being provided for selectively raising or lowering said connection.

4. A vehicle attachment according to claim 1, wherein the hydraulic actuating means is hingedly connected to the upstanding arm above and forwardly of the pivotal axis of the carrier frame and the connection of said hydraulic actuating means with the free end of the carrier frame is below the pivotal axis of the carrier frame.

5. A vehicle attachment according to claim 1, wherein the pivotal attachments for the carrier frame lie in a plane offset from and above the normal plane of said carrier frame.

6. A vehicle attachment according to claim 1, wherein the mounting frame is substantially U-shaped with the side arms thereof being attachable at a medial portion thereof to the front axle of the vehicle, and the rear ends of the side arms being attachable to the side rails of the main vehicle frame.

7. A vehicle attachment according to claim 6, wherein the attachment means for the U-shaped frame includes a sliding connection permitting limited movement of the frame with respect to the vehicle axle.

References Cited by the Examiner

UNITED STATES PATENTS

| | | | |
|---|---|---|---|
| 1,739,352 | 12/29 | Choate | 37—42 |
| 2,057,326 | 10/36 | Coates | 37—42 |
| 2,242,826 | 5/41 | Keeler | 37—42 |
| 2,565,337 | 8/51 | Allan | 37—144 |
| 2,792,650 | 5/57 | Kenyon | 37—42 |

FOREIGN PATENTS 593,967 10/47 Great Britain.

ABRAHAM G. STONE, *Primary Examiner.*

BENJAMIN HERSH, *Examiner.*